United States Patent [19]

Singh et al.

[11] Patent Number: 5,577,777
[45] Date of Patent: Nov. 26, 1996

[54] GROUND JOINT COUPLING HAVING A POLYMERIC SEAT

[75] Inventors: Paramjit Singh, Chestertown, Md.; Madhu K. Shenoy, Dover, Del.; Charles H. Schappert, West Chester, Pa.

[73] Assignee: Dixon Valve & Coupling Co., Chestertown, Md.

[21] Appl. No.: 335,558

[22] Filed: Nov. 7, 1994

Related U.S. Application Data

[63] Continuation of Ser. No. 854,317, Mar. 19, 1992, abandoned.

[51] Int. Cl.⁶ .............................. F16L 25/00; F16L 19/00
[52] U.S. Cl. .................. 285/354; 285/379; 285/332.2; 285/242; 285/334.3
[58] Field of Search .................... 285/354, 259, 285/349, 379, 242, 332.2, 334.2, 334.3

[56] References Cited

U.S. PATENT DOCUMENTS

| | | | |
|---|---|---|---|
| 449,293 | 3/1891 | McGuire | 285/379 |
| 489,107 | 1/1893 | Storz | 285/379 |
| 857,956 | 6/1907 | Mueller | 285/379 |
| 954,549 | 4/1910 | Turner | 285/379 |
| 1,083,350 | 1/1914 | Davis | 285/379 |
| 1,137,113 | 4/1915 | Bouchard | 285/379 |
| 2,102,072 | 12/1937 | Hinderliter | 285/332.2 |
| 2,128,473 | 8/1938 | Rice | 285/334.3 |
| 2,286,263 | 6/1942 | Comins | 285/334.2 |
| 3,142,499 | 7/1964 | Lang | 285/379 |
| 3,346,263 | 10/1967 | Newcomer | 285/379 |
| 3,964,772 | 6/1976 | Cox, Jr. | 285/251 |
| 4,324,423 | 4/1982 | Pitesky | 285/354 |
| 4,458,926 | 7/1984 | Williamson | 285/354 |
| 4,589,688 | 5/1986 | Johnson | 285/354 |
| 4,603,888 | 8/1986 | Goodall et al. | 285/259 |
| 4,674,775 | 6/1987 | Tajima et al. | 285/354 |
| 4,767,135 | 8/1988 | Holzmann | 285/379 |
| 4,886,303 | 12/1989 | Carson et al. | 285/379 |
| 4,930,791 | 6/1990 | Ungchusri et al. | 285/354 |
| 4,991,876 | 2/1991 | Mulvey | 285/354 |
| 5,076,313 | 12/1991 | Bottum, Jr. et al. | 285/379 |
| 5,131,695 | 7/1992 | Wiser | 285/354 |
| 5,364,135 | 11/1994 | Anderson | 285/38 |

FOREIGN PATENT DOCUMENTS

| | | | |
|---|---|---|---|
| 618790 | 4/1961 | Canada | 285/334.3 |
| 940025 | 3/1956 | Germany | 285/332.2 |
| 4677 | of 1910 | United Kingdom | 285/379 |
| 2114192 | 8/1983 | United Kingdom | 285/332.2 |

*Primary Examiner*—Eric K. Nicholson
*Attorney, Agent, or Firm*—John F. A. Earley; John F. A. Earley, III

[57] ABSTRACT

A ground joint coupling for hoses comprises a stem, a ground joint head formed at a first end portion of the stem, a spud having a first end portion, a molded polymeric annular seat adapted to be positioned between the ground joint head of the stem and the first end portion of the spud, and a nut for connecting the stem to the spud and for compressing the seat between the ground joint head of the stem and the first end portion of the spud. The seat may be made of polytetrafluoroethylene, ultra high molecular weight polyethylene, polyetheretherketone compounds, polyphenylene sulfide compounds, fluoroplastic compounds, or acetal compounds, and the seat may include a filler, such as glass, moly, carbon, bronze, graphite, calcium fluoride, polyphenoline-sulfide, ceramics, silica-based minerals, or combinations thereof.

19 Claims, 14 Drawing Sheets

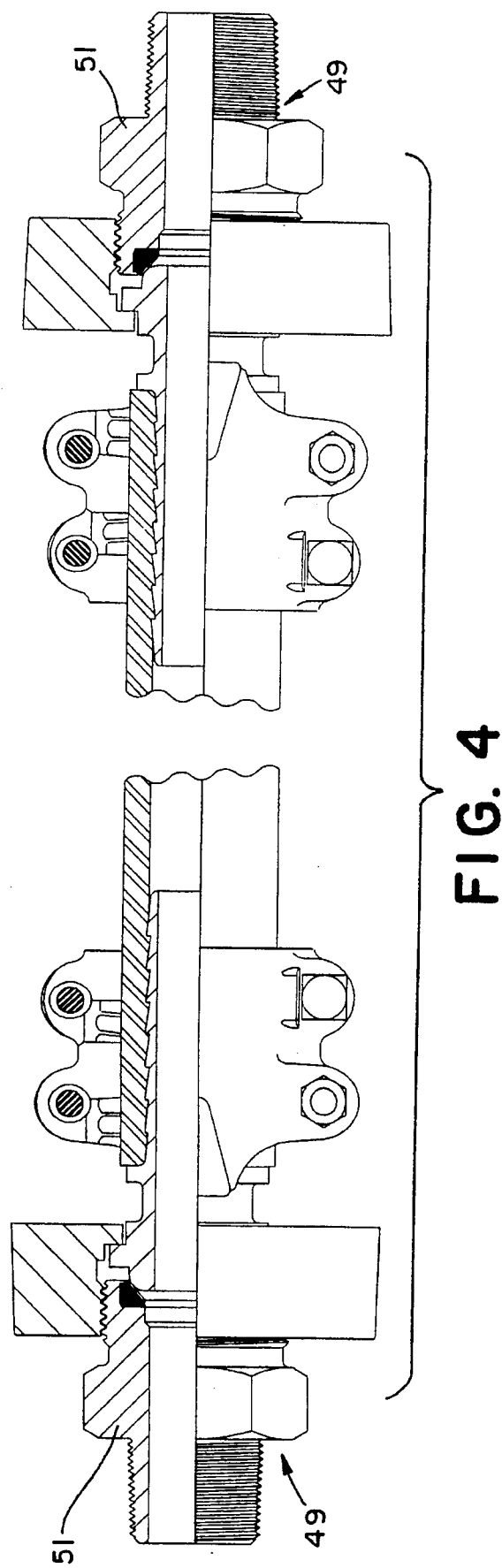

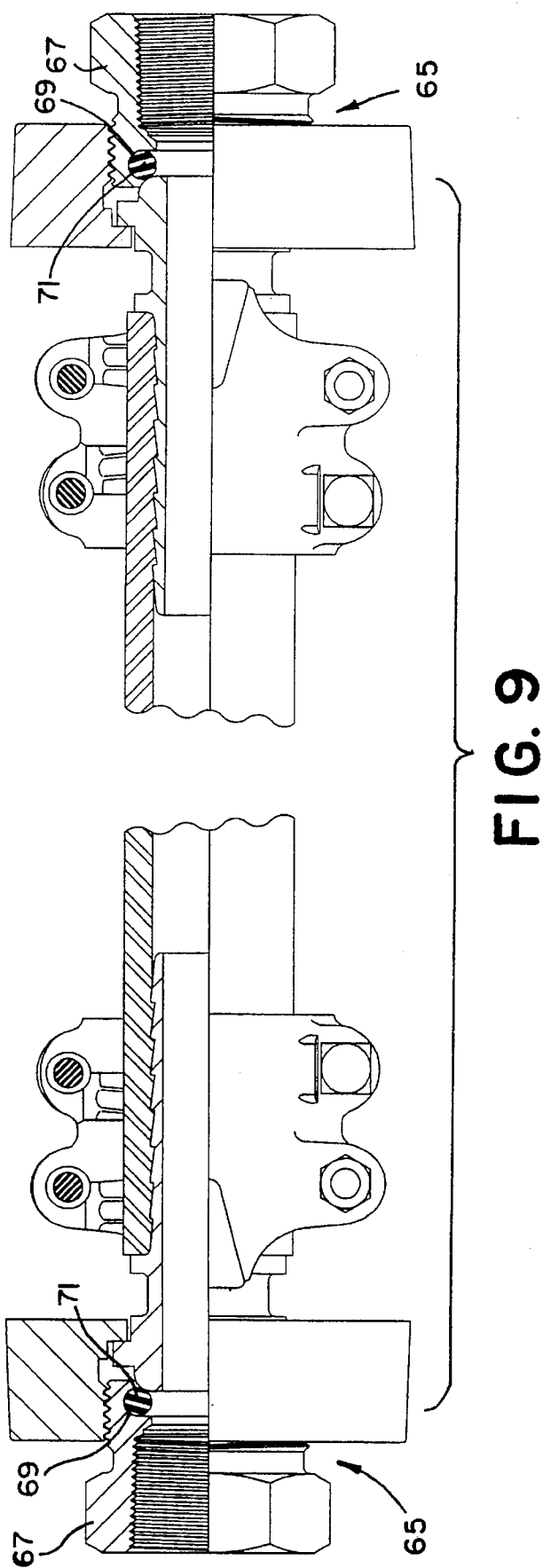

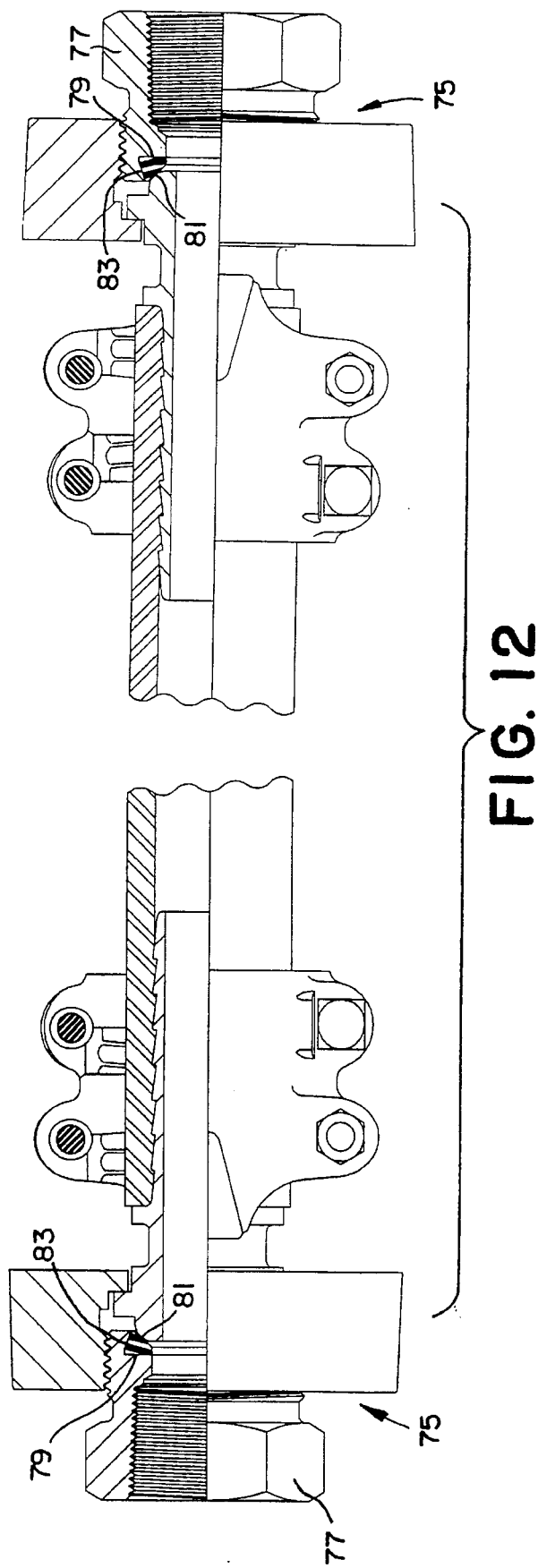

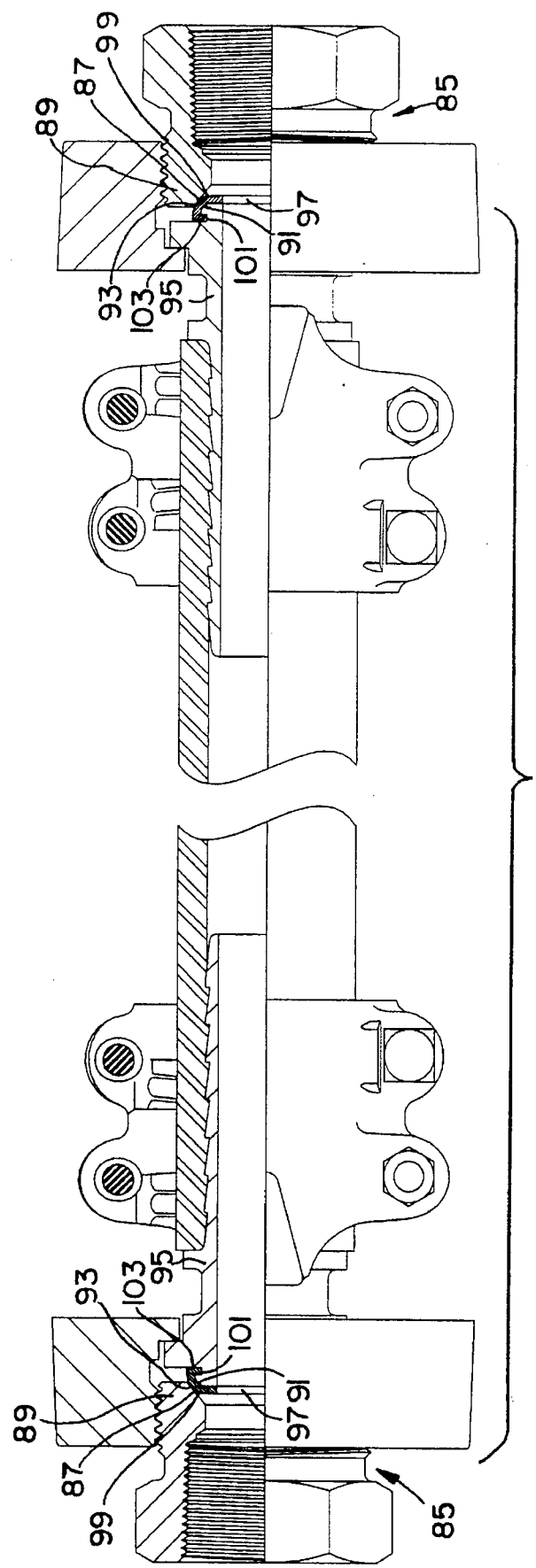

GROUND JOINT COUPLING HAVING A POLYMERIC SEAT

This is a continuation of application Ser. No. 07/854,317 filed on Mar. 19, 1992 now abandoned.

BACKGROUND OF THE INVENTION

1. Field of the Invention

The present invention relates to the field of ground joint couplings for hoses for transporting steam, high or low-pressure air, water, liquid petroleum gas, fluid petroleum products, chemicals, potable fluids, or almost any other type of fluid or gas, and more particularly concerns ground joint couplings having a polymeric seat for sealing the ground joint coupling.

2. Description of the Prior Art

Conventional ground joint couplings for hoses comprise a stem and a spud held together by a nut. Sealing the coupling between the stem and the spud is accomplished by pressing a ground joint head formed in one end portion of the stem into a copper seat positioned in a recess in an end portion of a spud.

With conventional ground joint couplings, the process of making the copper seat and the process of providing a spud having the copper seat are time consuming and wasteful.

A copper seat is made by cutting off or rolling off from a copper pipe a portion of appropriate length for the seat. This portion of copper pipe in the form of a ring is then annealed. The annealed ring is then manually placed in a recess formed in the end portion of the spud, where it is machined to the appropriate drawing dimensions. The spud, with the copper seat in place, is then zinc plated. The zinc plating is then polished off the copper seat.

Errors in these processes result in the copper seat and/or the spud with copper seat being scrapped or reworked.

Also, with the copper seat coupling, sealing requires impact tightening (e.g., tightening the coupling by impacting the lug of the nut manually with a hammer or the like). Accordingly, the copper seat is not field replaceable because the copper seat is very difficult to separate from the recess of the spud after impact tightening.

with the copper seat coupling, if the copper seat is dented during processing or handling, it is difficult to seal the coupling even after impact tightening.

SUMMARY OF THE INVENTION

It is an object of the invention to provide a ground joint coupling that does not require a copper seat to seal the coupling between its stem and its spud.

Another object of the invention is to provide a ground joint coupling that may be produced more efficiently and in less time than a copper seat ground joint coupling.

Another object of the invention is to provide a ground joint coupling having a polymeric seat that may be field replaceable and that provides required sealing by wrench tightening and that does not require impact tightening to obtain an effective seal.

BRIEF DESCRIPTION OF THE DRAWINGS

FIG. 4 is a view in elevation, partly in section of a second ground joint coupling constructed in accordance with this invention;

FIG. 9 is a view in elevation, partly in section of a fifth ground joint coupling constructed in accordance with this invention;

FIG. 12 is a view in elevation, partly in section of a sixth ground joint coupling constructed in accordance with this invention;

FIG. 15 is a view in elevation, partly in section of a seventh ground joint coupling constructed in accordance with this invention showing a seat mounted on the outer surface of a stem;

DETAILED DESCRIPTION OF THE INVENTION

Figure 1:
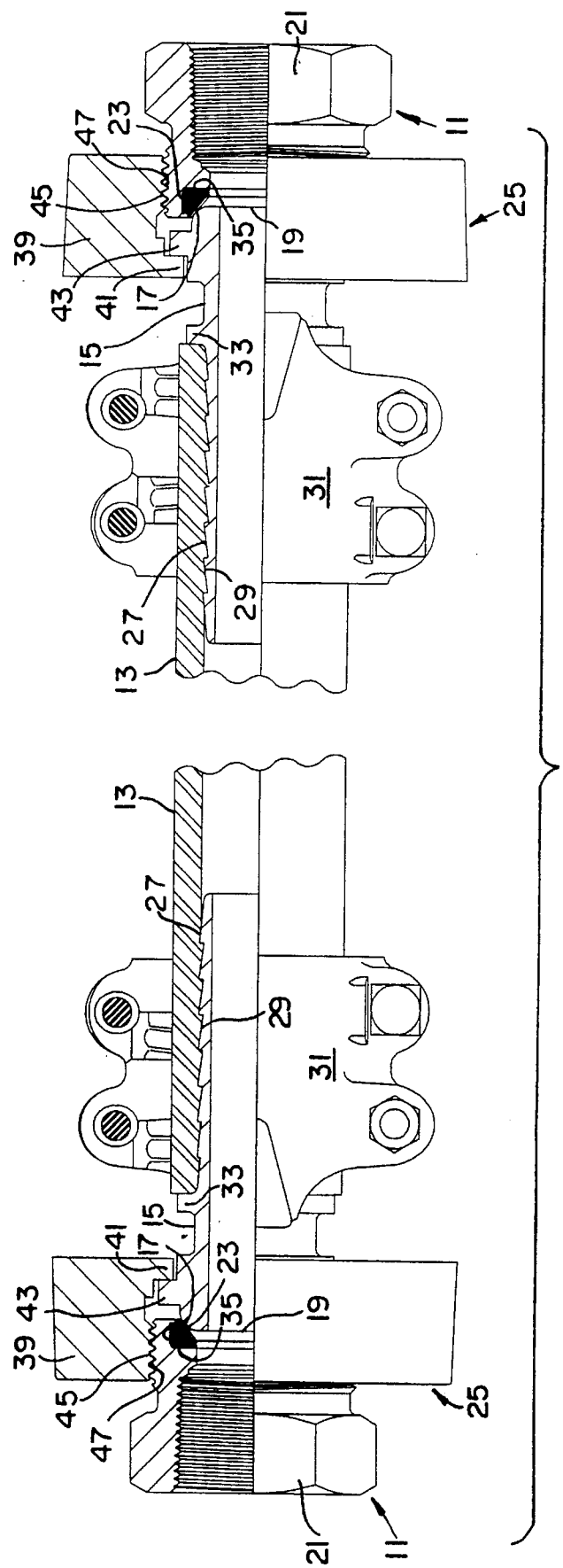
FIG. 1 is a view in side elevation, partially in longitudinal section of a ground joint coupling constructed in accordance with this invention.

Turning to the drawings, there is shown in FIG. 1 a ground joint coupling 11 for hoses 13 for transporting steam, high or low-pressure air, water, liquid petroleum gas, fluid petroleum products, chemicals, potable fluids, or almost any other type of fluid or gas. Ground joint coupling 11 comprises a stem 15, preferably of carbon steel, stainless steel, or malleable iron, having a ground joint head 17 formed at the first end portion 19 of stem 15, a spud 21, preferably of carbon steel, stainless steel, or malleable iron, a molded annular seat 23 positioned between the ground joint head 17 and spud 21, and connection and compression means 25 for connecting the stem 15 to the spud 21 and for compressing the seat 23 between the ground joint head 17 and the spud 21.

A hose barb 27 is formed at the second end portion 29 of stem 15 which is inserted into hose 13. A clamp 31, preferably of carbon steel, stainless steel, or malleable iron, clamps a portion of hose 13 against barb 27. A first integral collar 33 is formed on stem 15 at the end of barb 27, and first collar 33 acts as a stop for the end of hose 13.

Figure 2:
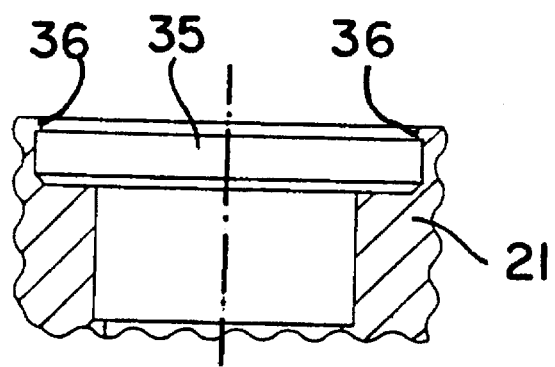
FIG. 2 is a partial view in section of a recess formed in the spud of the inventive ground joint coupling.

As shown in FIG. 1, and more particularly in FIG. 2, a recess 35 is formed on the first end portion of spud 21 which receives seat 23.

Seat 23 is polymeric based, and preferably elastomeric based, and may be provided with a filler. The amount of filler added to the polymer is in the range of 0% to about 80% by weight of the seat 23. The maximum useful filler content is about 40% by volume, and the corresponding weight percentage to this may vary from 20% to 80%, depending on the density of the filler.

Polymers that may be used include polytetrafluoroethylene (PTFE), ultra high molecular weight polyethylene (UHMWPE), polyetheretherketone compounds (PEEK), polyphenylene sulphide compounds (PPS), fluoroplastic compounds, and acetal compounds.

Filler that may be used includes glass, moly, carbon, bronze, graphite, calcium fluoride, polyphenolinesulfide (PPS), ceramics, silica-based minerals, carbon/graphite, stainless steel, and combinations thereof. Preferably, the filler is in a powder form, except glass which preferably is in a fiber form or a bead form.

A preferred seat 23 comprises polytetrafluoroethylene (PTFE), alone or with a filler. Filler includes glass, moly, carbon, bronze, graphite, calcium fluoride, polyphenolinesulfide (PPS), ceramics, silica-based minerals, carbon/graphite, stainless steel, and combinations thereof. Polytetrafluoroethylene (PTFE) is sold under such trademarks as TEFLON (DuPont), RULON (Furon), TURCITE (Shamban), and ALGOFLON (Ansimont).

Illustrative examples of the PTFE compounds are as follows:

| PTFE COMPOUNDS |
| --- |
| 100% PTFE (VIRGIN) |
| 75% PTFE, 25% GlASS |
| 80% PTFE, 15% GLASS, 5% MOLY |
| PTFE, PPS, CARBON, MOLY |
| PTFE, PPS, GLASS |
| 85% PTFE, 15% GLASS |
| 75% PTFE, 25% GLASS (GREEN) |
| 95% PTFE, 5% MOLY |
| 40% PTFE, 55% BRONZE, 5% MOLY |
| 85% PTFE, 15% GRAPHITE |
| 80% PTFE, 20% CALCIUM FLUORIDE |
| 76% PTFE, 22% PPS, 4% GRAPHITE |
| 70% PTFE, 25% CARBON, 5% CERAMIC |
| 98% PTFE, 2% CARBON |
| 85% PTFE, 15% MINERAL-SILICA BASED |
| 65% PTFE, 30% GLASS, 5% MOLY |
| 90% PTFE, 5% GLASS, 5% GRAPHITE |
| 85% PTFE, 15% CARBON/GRAPHITE |
| 55% PTFE, 40% GLASS, 5% MOLY |
| 20% PTFE, 80% STAINLESS STEEL |
| 30% PTFE, 70% STAINLESS STEEL |
| 40% PTFE, 60% BRONZE |
| 60% PTFE, 40% BRONZE |
| 60% PTFE, 40% GLASS |
| 75% PTFE, 25% PPS (POLYPHENOLINESULFIDE) |
| 55% PTFE, 40% BRONZE, 5% MOLY |

All percentages are by percentage weight.

A seat 23 of polytetrafluoroethylene (PTFE), a non-thermo processable plastic, may be made by a cold compression process followed by a sintering at a temperature above 625° F.

Using a compression process, powdered PTFE is blended with the filler, if a filler is being used. Then, the blend of PTFE and filler, or the powdered PTFE alone if no filler is being used, is mechanically pelletized using a pelletizer. The pelletized composition is then placed into a mold shaped to form the seat 23 and compression molded at room temperature using a high pressure press at 2000 to 10000 psi to form semi-finished seats. The semi-finished seats are sintered at a temperature above 685° F. for about one hour per inch of cross-section of the seat, deburred using a ceramic material in a vibratory tumbler, and machined if necessary.

Also, PTFE-based seats 23 may be made by slowly ram extruding a partially sintered powdered PTFE composition, which includes PTFE alone or with a filler, in short increments, at a pressure of about 7,000 psi to 10,000 psi and sintering at a temperature of about 685° F. to produce a polymer billet, in tube or rod form. The ram extruded billet is then cut into individual pieces to form semi-finished seats 23 and the semi-finished seats 23 are then machined into finished seats 23.

Illustrative examples of other preferred compounds are as follows:

| POLYETHYLENE COMPOUNDS |
| --- |
| 100% UHMWPE (Ultra-High Molecular Weight Polyethylene) |
| POLYETHERETHERKETONE COMPOUNDS (PEEK) |
| 100% PEEK (UNFILLED) |
| 80% PEEK, 20% GLASS |
| 70% PEEK, 30% GLASS |
| POLYPHENYLENE SULFIDE COMPOUNDS (PPS) |
| 60% PPS, 40% GLASS |
| 60% PPS, 40% GLASS/GRAPHITE |
| FLUOROPLASTIC COMPOUNDS |
| 100% PVDF VIRGIN - KYNAR |
| 80% PVDF, 20% CARBON - KYNAR 320 |
| 100% PCTFE VIRGIN - KEL-F |
| 70% PFA, 30% GLASS - TEFLON |
| 100% PETFE VIRGIN - TEFZEL |
| ACETAL COMPOUNDS (POM) |
| HOMOPOLYMER VIRGIN - DELRIN |
| COPOLYMER VIRGIN - CELCON |

Again, all percentages are by percentage weight.

A seat 23 of ultra-high molecular weight polyethylene (UHMWPE), a linear polyolefin thermoplastic, may be made by compression molding pelletized UHMWPE at 390° F.–410° F. and at a pressure of about ½ ton per square inch, followed by cooling while the seat 23 remains in the mold. Also, UHMWPE based seats 23 may be made by a ram extrusion process, wherein powdered UHMWPE is extruded into billets at a pressure of about ½ ton per square inch and is sintered at about 390° F. The ram extruded billet is then cut into individual pieces to form semi-finished seats 23, and the semi-finished seats 23 are then machined into finished seats 23. UHMWPE is sold under such trademarks as CADCO (Cadilac Plastics), SOLIDUR (Solidur Plastics), and HOSTALEN GUR (Hoechst Celanese). Preferably, no fillers are used with UHMWPE.

A seat 23 based on polyetheretherketone (PEEK), a crystalline aromatic thermal plastic, may be made by injection molding a pelletized PEEK composition, which includes PEEK alone or with a filler, at 600° F.–750° F. at screw speeds in the region of 150–200 min.$^{-1}$. Then, the injection molded seat 23 may be machined into its final form. Also, the PEEK-based seat 13 may be made by compression molding a pelletized PEEK composition, which includes PEEK alone or with a filler, at about 750° F. and about 8,000 to 10,000 psi, and then machining the compression molded seat 23 into its final form. A PEEK-based seat 23 also may be made by ram extrusion, as described for the PTFE-based seats 23 and the UHMWPE seats 23, at a temperature of 660° F. and a pressure of 8,000 to 10,000 psi. Polyetheretherketone (PEEK) is sold under such trademarks as VICTREX (ICI), and ARLON (Greene Tweed). Filler such as glass, carbon, and PTFE may be used with polyetheretherketone (PEEK).

A seat 23 based on poly phenylene sulfide (PPS), a linear aromatic thermoplastic, may be made by injection molding a pelletized PPS composition, which includes PPS alone or with a filler, at 575° F.–675° F. at screw speeds of 150–200 min.$^{-1}$. Then, the injected molded seats may be machined into their final form. Also, a PPS-based seat 23 may be made by compression molding a pelletized PPS composition, which includes PPS alone or with a filler, at 575° F.–675° F. at 8,000–12,000 psi, allowing the seat 23 to cool while in the mold, deburring the seat 23 in a vibratory tumbler, and machining the seat 23 if necessary. A PPS-based seat 23 also may be made by ram extrusion, as described for the PTFE-based seats 23 and the UHMWPE seats 23, at a temperature of 575° F.–675° F. and a pressure of 8,000 to 12,000 psi. Poly Phenylene Sulfide (PPS) is sold under such trademarks as RYTON (Phillips 66), FORTRON (Hoechst Celanese), SUFIL (Wilson-Fiberfill), and SUPEC (GE Plastics). Suitable filler includes glass, glass/graphite, carbon, and PTFE.

A seat 23 based on poly chlorotrifluoroethylene (PCTFE), a crystalline thermoplastic, may be made by injection molding a pelletized PCTFE composition, which includes PCTFE alone or with a filler, at a temperature around 425° F. and at screw speeds in the region of 150–200 min.$^{-1}$. PCTFE-based seats 23 also may be made by ram extrusion, as described for the PTFE-based seats 23 and the UHMWPE seats 23, at a temperature of about 425° F. and a pressure of 7,000 to 10,000 psi. However, preferably, the PCTFE composition is in a pelletized form rather than a powder form before being extruded. Poly chlorotrifluoroethylene (PCTFE) is sold under such trademarks as KEL-F (3M) and DAIFLON (Daikin). Usually, no fillers are used with poly chlorotrifluoroethylene (PCTFE), but glass fibers may be used.

A seat 23 based on polyvinylidene fluoride (PVDF) may be made by injection molding a pelletized PVDF composition, which includes PVDF alone or with a filler, at a temperature around 338° F. and at a screw speed of 150–200 min.$^{-1}$. Also, PVDF-based seats 23 also may be made by ram extrusion, as described for the PTFE-based seats 23 and the UHMWPE seats 23, at a temperature of about 338° F. and a pressure of 7,000 to 10,000 psi. PVDF is sold under the trademark KYNAR (Ansimont), and carbon may be used with PVDF as a filler.

A seat 23 of poly perfluoro alkoxy (PFA) may be made by injection molding a pelletized PFA composition, which includes PFA alone or with a filler, at a temperature around 580° F. and at screw speeds of 150–200 min.$^{-1}$ PFA-based seats 23 also may be made by ram extrusion, as described for the PTFE-based seats 23 and the UHMWPE seats 23, at a temperature of about 580° F. and a pressure of 7,000 to 10,000 psi. However, preferably, the PFA composition is in a pelletized form rather than a powder form before being extruded. PFA is sold under the trademark TEFLON (DuPont). A PFA seat 23 may have glass in it as a filler.

A seat 23 of poly ethylene chloro trifluoro ethylene (PETFE) may be made by injection molding pelletized PETFE at a temperature around 518° F. and at screw speeds of 150–200 min.$^{-1}$. PETFE-based seats 23 also may be made by ram extrusion, as described for the PTFE-based seats 23 and the UHMWPE seats 23, at a temperature of about 518° F. and a pressure of 9,000 to 12,000 psi. PETFE is sold under the trademark TEFZEL (DuPont).

A seat 23 of acetal compounds may be made by injection molding pelletized acetal compounds at a temperature around 500° F. and screw speeds of 150–200 min.$^{-1}$. Acetal compound based seats 23 also may be made by ram extrusion, as described for the PTFE-based seats 23 and the UHMWPE seats 23, at a temperature of about 500° F. and a pressure of 10,000 psi. Acetal compounds are sold under such trademarks as DELRIN (DuPont) and CELCON (Celanese).

Regarding the processes of compression molding, ram extrusion, and injection molding, reference is made to *Concise Encyclopedia Of Polymer Science and Engineering* (Jacqueline I. Kroschwitz, Executive Editor; John Wiley & Sons, Publisher), which is incorporated herein by reference.

Figure 3:
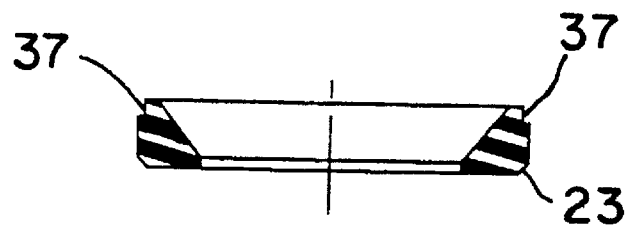
FIG. 3 is a view in elevation, partly in section of a seat constructed in accordance with the invention.

Referring to FIGS. 2 and 3, an annular flange 36, which partially protrudes over recess 35, abuts against a shoulder 37 formed in seat 23 after seat 23 is squeezed into recess 35, thereby holding seat 23 in recess 35.

Connection and compression means 25 includes a nut 39, preferably of carbon steel, stainless steel, or malleable iron, having a shoulder 41 that engages a second collar 43 that is formed on and is integral with stem 15. Nut 39 has internal threads 45 that engage external threads 47 formed on spud 21.

To assemble coupling 11 onto hose 13, hose 13 is positioned on barb 27, and clamp 31 is tightened to secure hose 13 to barb 27.

Prior to hose 13 being positioned on barb 27, nut 39 is slid onto stem 15 so that shoulder 41 of nut 39 may engage second collar 43 of stem 15. Spud 21 is then screwed into nut 39 with internal threads 45 engaging external threads 47.

Seat 23, which is pressed or squeezed into recess 35 of spud 21, provides a seal between stem 15 and spud 21 as ground joint head 17 presses into seat 23 when spud 21 is screwed into nut 39.

FIGS. 4–19 show alternative embodiments of the invention.

FIG. 4 shows a ground joint coupling that is substantially the same as the ground joint coupling 11 of FIG. 1, except female spud 21 is replaced by a male spud 51. Male spud 51, like spud 21 is provided with a recess 35 (FIG. 2) for holding the seat.

Figure 5:
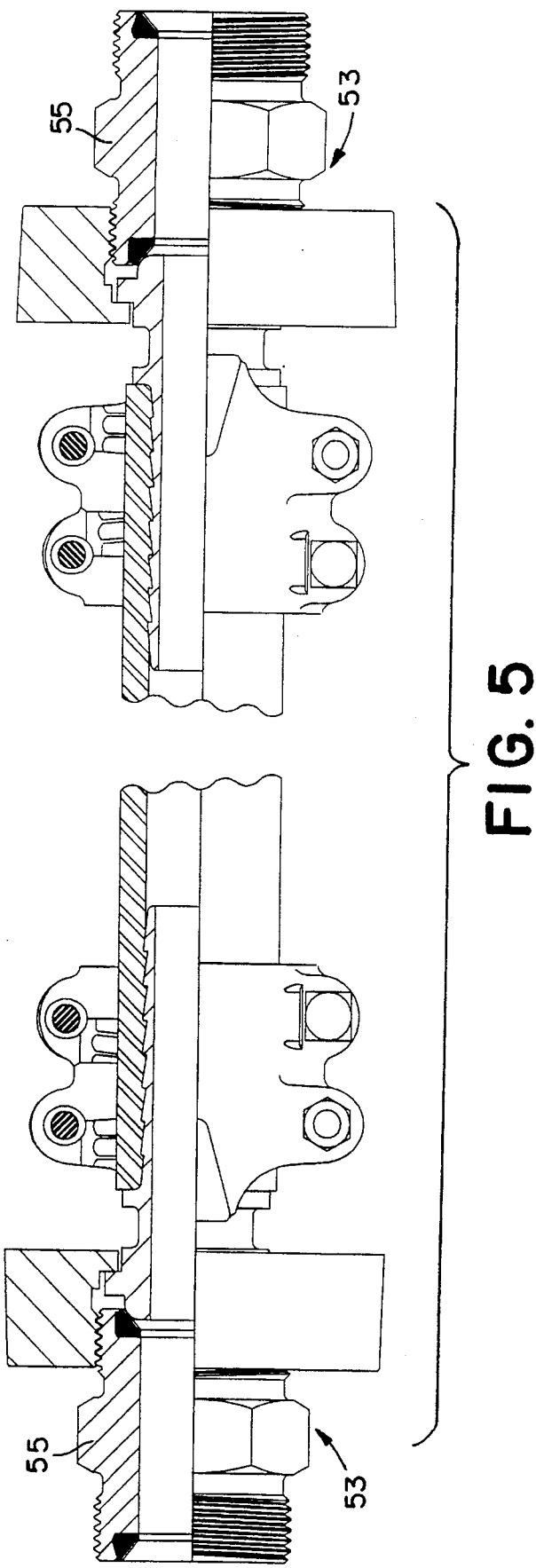
FIG. 5 is a view in elevation, partly in section of a third ground joint coupling constructed in accordance with this invention.

FIG. 5 shows another inventive ground joint coupling 53. Coupling 53 is substantially the same as coupling 11, except female spud 21 is replaced by double spud 55. Double spud 55, like spud 21 is provided with a recess 35 (FIG. 2) for holding the seat.

Figure 6:
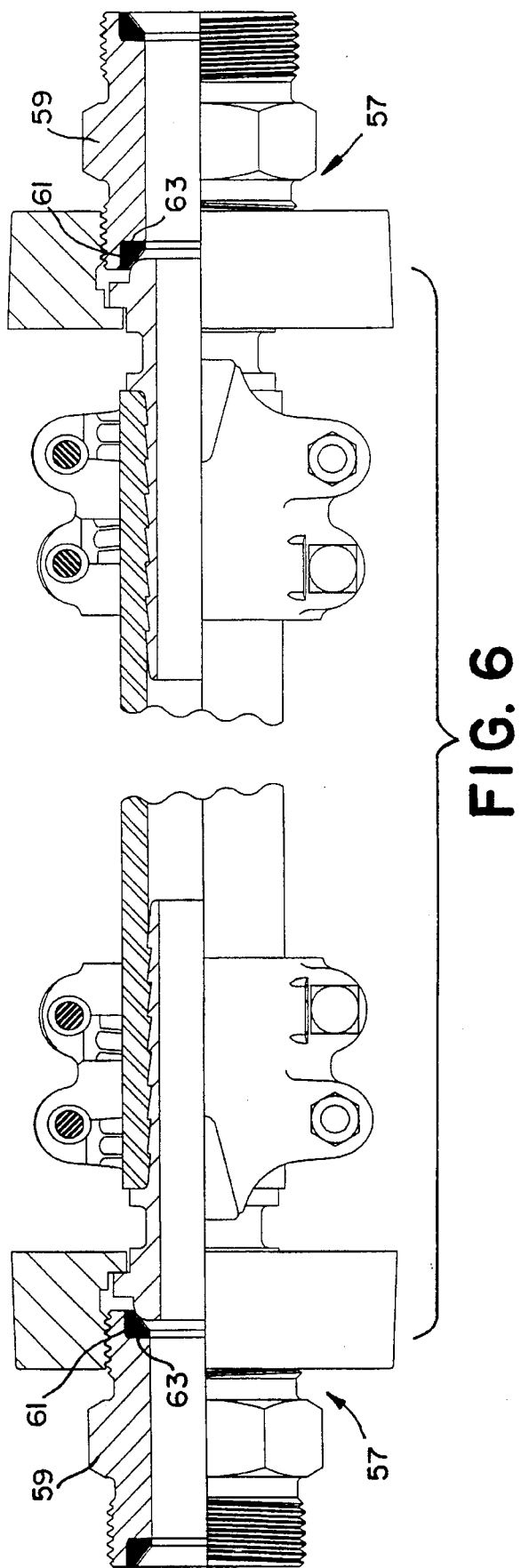
FIG. 6 is a view in elevation, partly in section of a fourth ground joint coupling constructed in accordance with this invention.
Figure 8:
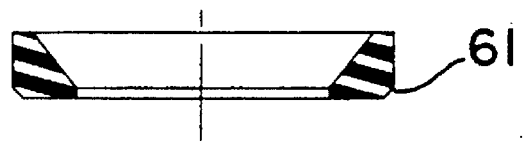
FIG. 8 is a sectional view of an inventive seat shown in FIG. 6.
Figure 7:
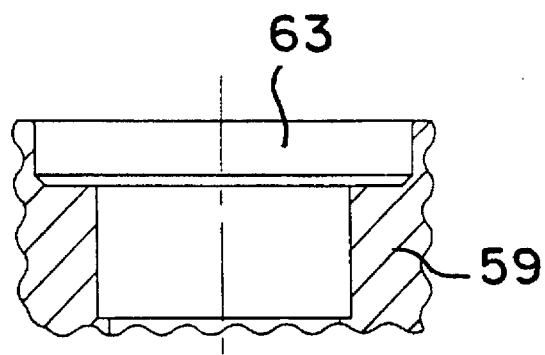
FIG. 7 is a partial view in section of a recess formed in the spud of the inventive ground joint coupling of FIG. 6.

FIGS. 6–8 show another inventive ground joint coupling 57. In this embodiment of the invention, a double spud 59 is used. However, a male spud or female spud may be used in place of double spud 59. Coupling 57 is substantially the same as coupling 53 of FIG. 5, except seat 61, unlike seat 23, is not provided with a shoulder, and recess 63, unlike recess 35, is not provided with a flange. Seat 61 is held firmly inside in recess 63 via a press fit since the outside diameter of the seat 61 is larger than the inside diameter of recess 63.

Figure 11:
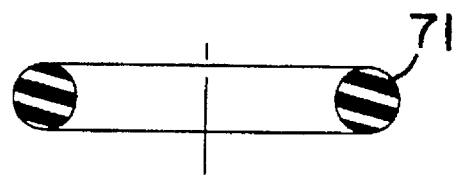
FIG. 11 is a sectional view of an inventive seat shown in FIG. 9.
Figure 10:
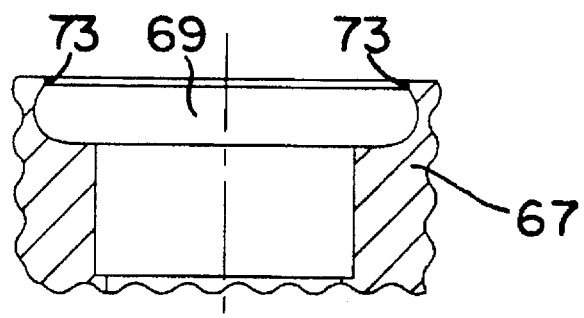
FIG. 10 is a partial view in section of a recess formed in the spud of the inventive ground joint coupling of FIG. 9.

FIGS. 9–11 show another ground joint coupling 65 of the invention. In this embodiment of the invention, a female spud 67 is used. However, a male spud or double spud may also be used in this embodiment of the invention. Spud 67 is provided with a recess 69 (FIG. 10), which is shaped to receive an O-ring-type annular seat 71 (FIG. 11). Recess 69 has an annular flange 73 which aids in holding seat 71 in recess 69.

Figure 14:
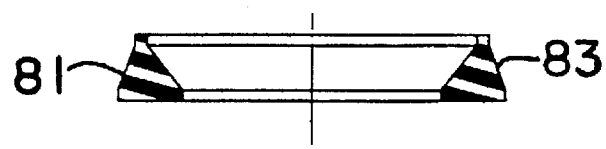
FIG. 14 is a sectional view of an inventive seat shown in FIG. 12.
Figure 13:
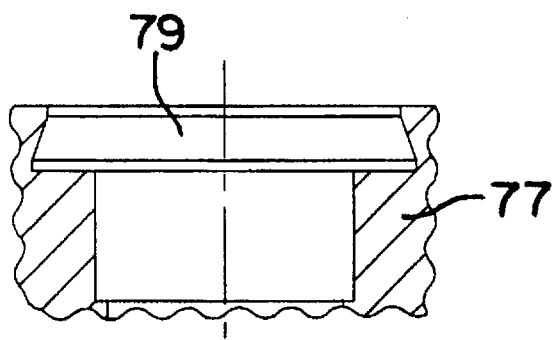
FIG. 13 is a partial view in section of a recess formed in the spud of the inventive ground joint coupling of FIG. 12.

FIGS. 12–14 show still another ground joint coupling 75 of the invention. In this embodiment of the invention, a female spud 77 is used, but a male spud or double spud may also be used in this embodiment of the invention. Spud 77 is provided with a recess 79 (FIG. 13), which is shaped to receive a seat 81 having a tapered outer surface 83.

Figure 16:
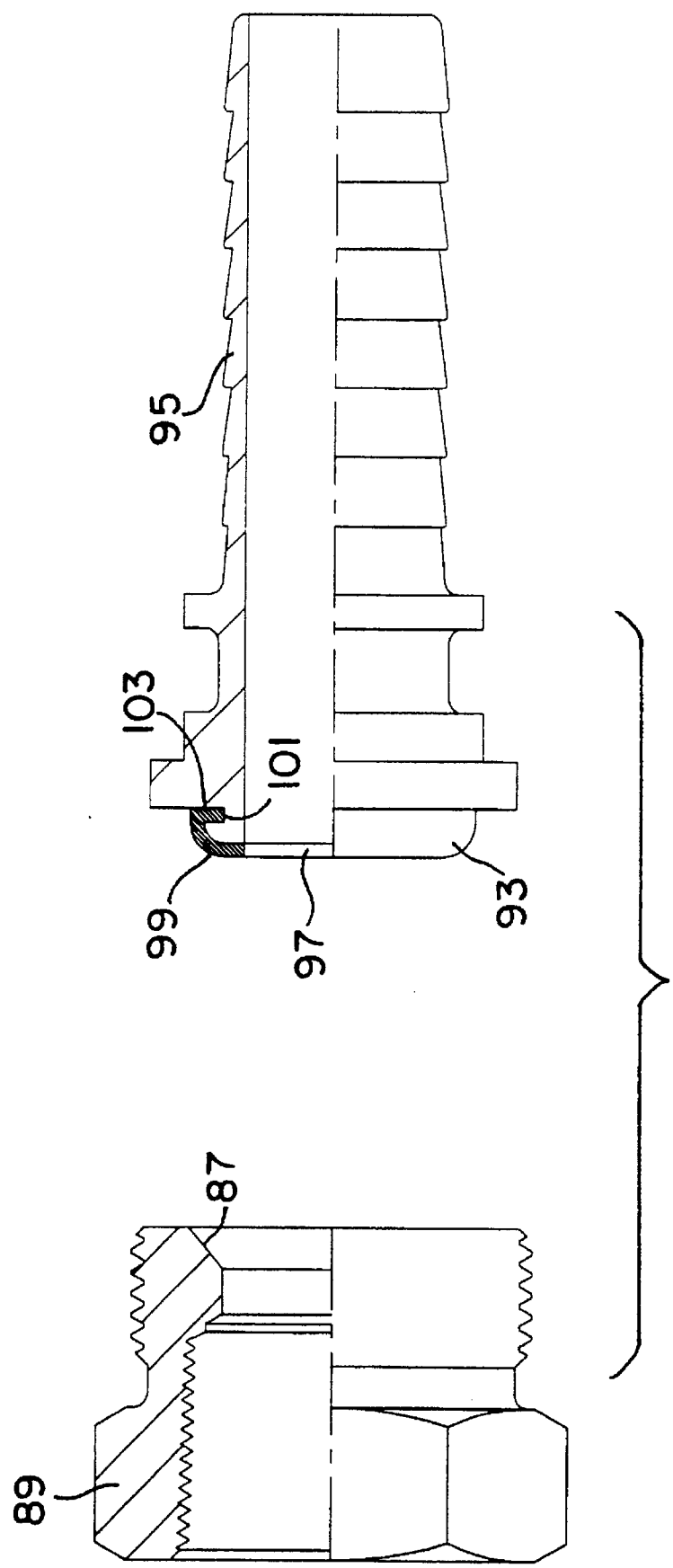
FIG. 16 is an exploded view in elevation and partial section of the stem and spud of the coupling shown in FIG. 15 showing the seat installed on the stem.

FIGS. 15–16 illustrate another embodiment of the invention. Here, coupling 85 has a chamfered surface 87 formed on the first end portion of spud 89 that is adapted to press against a seat 91 that is mounted on the first end portion 93 of stem 95. As shown in FIGS. 15 and 16, a ledge 97 is formed at the first end portion 93 of stem 95 which receives a first end portion 99 of seat 91. An annular channel 101 also is formed in the first end portion 93 of stem 95 which receives the second end portion 103 of seat 91. Seat 91 rests against the outer surface of first end portion 93 as seat 91 extends between its first end portion 99 resting on ledge 97 and its second end portion 103 positioned in channel 101. Seat 91 is pressed onto stem 95.

Figure 17:
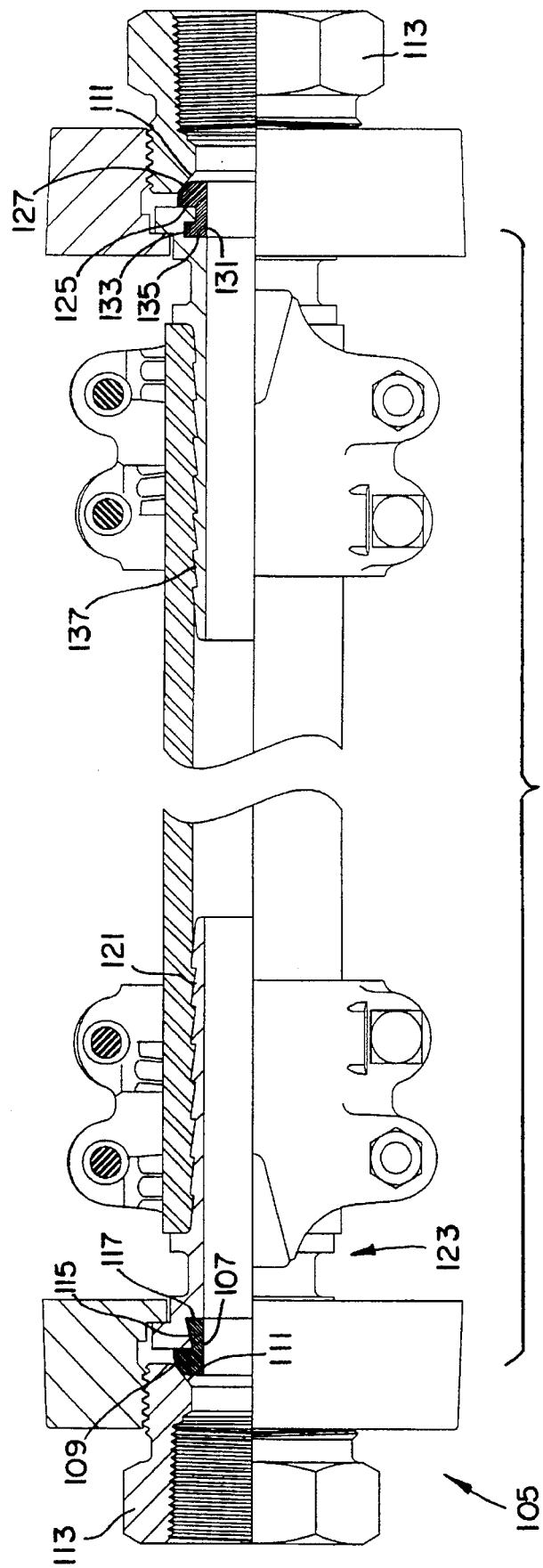
FIG. 17 is a view in elevation, partly in section of an eighth and ninth ground joint coupling constructed in accordance with this invention.
Figure 18:
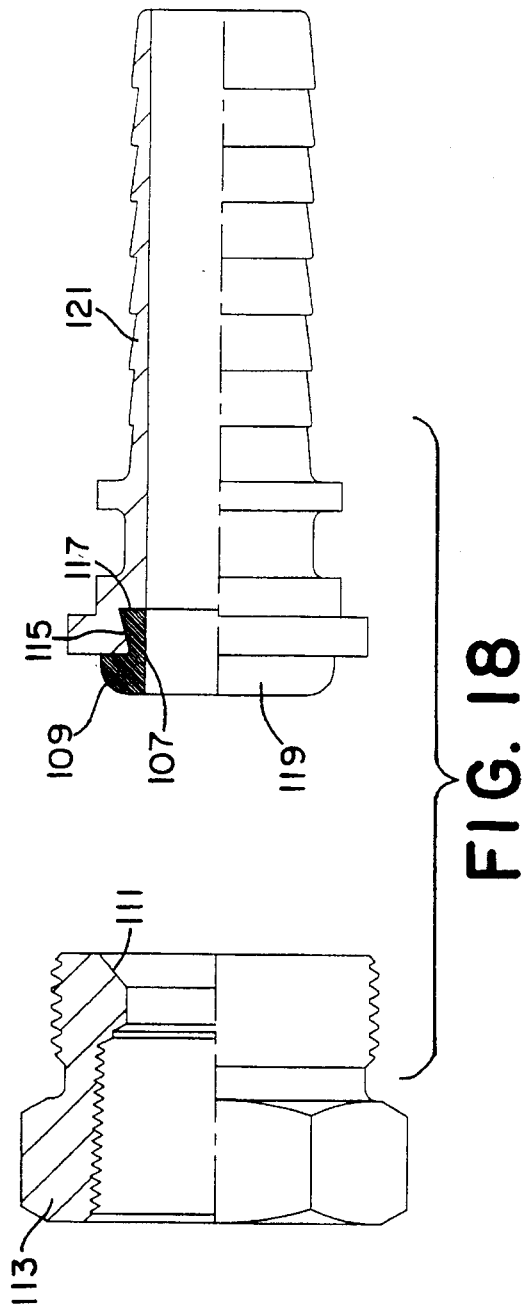
FIG. 18 is an exploded view in elevation and partial section of the stem and spud of the eighth coupling shown in FIG. 17 showing the seat installed on the stem.
Figure 19:
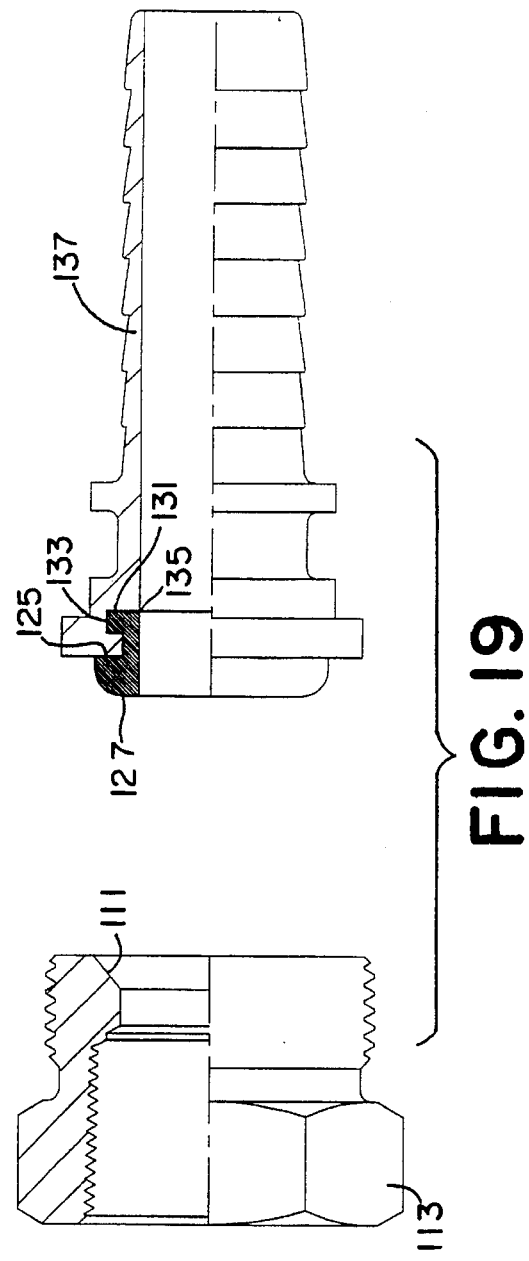
FIG. 19 is an exploded view in elevation and partial section of the stem and spud of the ninth coupling shown in FIG. 17, showing the seat installed on the stem.

Referring to FIGS. 17–19, two more alternative embodiments of the invention are illustrated. In the left-hand coupling 105 shown in FIG. 17, a seat 107 is shown, and more clearly shown in FIG. 18, having a first end portion 109 adapted to be pressed against a chamfered surface 111 of spud 113, and a ramp-shaped second end portion 115 that is adapted to be received in a similarly shaped recess 117 formed in the first end portion 119 of stem 121.

Coupling 123 shown on the right-hand side of FIG. 17 has a seat 125, more clearly shown in FIG. 19, having a first end portion 127 adapted to be squeezed against chamfered surface 111 of spud 113, and a second end portion 131 having an outwardly extending annular shoulder 133, the second end portion 131 of seat 125 being received in a correspondingly shaped recess 135 formed in stem 137.

In each of FIGS. 12–19, a female spud is used for illustration purposes. However, a male spud or double spud may also be used in these embodiments of the invention.

Seats 61, 71, 81, 91, 107, and 125 have the same composition as seat 23.

ADVANTAGES

The inventive coupling is an all-purpose hose coupling which may be used in conjunction with steam hose connections. The inventive coupling may also be used with hoses for transporting high or low-pressure air, water, liquid petroleum gas, fluid petroleum products, chemicals, potable fluids, and almost any other type of fluid or gas.

The inventive coupling eliminates the waste involved with copper seats.

The seat of the invention is recommended for use in temperatures up to 500° F., which is more than the maximum tube temperature limitation of steam hose (406° F. at 250 p.s.i.), and is recommended for temperatures down to −100° F.

Since sealing of a coupling using a copper seat is achieved by impact tightening, the copper seat is not field replaceable. Further, if a copper seat is dented, it is hard to seal the coupling using it even after impact tightening. However, unlike copper seat couplings, sealing of the inventive coupling is achieved by wrench tightening, and impact tightening is not necessary, although impact tightening may be done without sacrificing any benefits of the invention. Accordingly, the polymeric seat of the invention is field replaceable. Further, the inventive seat, if dented, is easily sealed even with wrench tightening.

The inventive coupling offers many advantages over the standard copper seat coupling. For example, unlike the wasteful and time consuming process of providing spuds with a copper seat, the process of providing a spud with a seat of the invention involves only a few steps. Specifically, after the spud of the invention is formed (same steps as those in the process of making spuds with a copper seat), the spud is zinc plated, and the polymer seat is pushed with slight pressure into the internal recess formed on the first end portion of the spud. The need to anneal the copper ring, to roll it into the recess in the first end portion of the spud, to machine the copper seat to the appropriate dimension, and to polish zinc plating off the copper seat after the spud is zinc plated is eliminated.

Because assembling a polymeric seat onto a spud in accordance with the invention requires fewer steps than assembling a copper seat onto a spud, fewer quality control steps are needed for assembling polymeric seat couplings that are needed for assembling copper seat couplings.

Likewise, assembling a polymeric seat of the invention onto a spud requires less handling of parts than that required for assembling a copper seat onto a spud.

Shorter lead time is needed to assemble seats of the invention onto spuds than is needed to assemble copper seats onto spuds because assembling the inventive polymeric seat onto spuds, when compared to assembling copper onto spuds, requires fewer operational steps, less handling time, fewer quality control steps, and greater ease in scheduling due to fewer operations.

Due to the ease of manufacturing the components of the inventive coupling, a high inventory of product is not required to be kept.

Also, extruded polymer/polymer-filler billets may be stock piled, if desired, for later processing into finished seats.

Since fewer steps are required to assemble a polymeric seat onto a spud than are required to assemble a copper seat onto a spud, the chances of defects occurring are smaller. Accordingly, the amount of scrap produced and reworking required on assembled spuds is less with the process of assembling a polymeric seat of the invention onto a spud than it is with the process of assembling a copper seat onto a spud.

We claim:

1. A ground joint coupling (11) for steam hoses comprising a stem (15), a head (17) formed at a first end portion 19 of the stem (15) and having a head sealing surface comprising an exterior bevel flaring outwardly and rearwardly from the end of the end portion (19), a spud (21) having a first end portion facing the first end portion (19) of the stem (15), the spud (21) being coaxial with the stem (15), seat receiving means formed in the first end portion of the spud (21) for receiving a seat (23) having a seat outer surface profile, said seat receiving means comprising an interior recess (35) having a surface profile conforming to said seat outer surface profile for preventing distortion of the outer surface profile of said polymeric seat and having a flange (36) at the end of the spud (21) with the flange extending inwardly for removably holding said seat in said interior recess, a molded polymeric annular seat positioned in said interior recess (35) of the spud (21), said seat having a radially inwardly angular inner seat sealing surface which complements and forms a sealing line of contact with said head sealing surface, connection and compression means (39) for connecting the stem (15) to the spud (21) by forcing said outside bevel of the stem against the inner seat sealing surface and providing a seal between the stem (15) and the spud (21), and means for preventing direct contact between the stem (15) and the spud (21).

2. A ground joint coupling for steam hoses comprising a stem (95), a head formed on a first end portion (93) of the stem (95), a spud (89) having a first end portion facing the first end portion (93) of the stem (95), the spud (89) being coaxial with the stem (95), a chamfered annular surface (87) formed inside the first end portion (93) of the spud, seat receiving means formed on the head of the stem (95) for receiving a seat (91), said seat receiving means including an annular outside radial channel 101 formed in the head of the stem (95) transverse to the axis of the stem (95), molded polymeric annular seat (91) positioned in said outside channel (101), said seat (91) having a second end portion (103) fitting into said outside radial channel (101) for mounting said seat (91) onto the head of the stem (95), said seat (91) having a first end portion (99) pressing against the chamfered surface (87) of the spud (89), connection and compression means for connecting the stem (95) to the spud (89) and for pressing the head and the first end portion (99) of the seat (91) against the inside chamfered surface (87) of the spud (89) for providing a seal between the stem (95) and the spud (89)

said seat being formed from polytetrafluouroethylene, ultra high molecular weight polyethylene, polyetheretherketone compounds, polyphenylene sulfide compounds, fluoroplastic compounds, or acetal compounds, said seat further including a filler, the filler including glass, moly, carbon, bronze, graphite, calcium fluoride, polyphenolinesulfide, ceramics, silica-based minerals, PFA, stainless steel, or combinations thereof.

3. The ground joint coupling of claim 1, further including a hose barb formed at the second end portion of the stem.

4. The ground joint coupling of claim 1, further including the connection and compression means including a nut.

5. The ground joint coupling of claim 1, further including the seat being formed from polytetrafluoroethylene.

6. The ground joint coupling of claim 5, the seat further including a filler.

7. The ground joint coupling of claim 6, the filler including glass, moly, carbon, bronze, graphite, calcium fluoride, polyphenolinesulfide, ceramics, silica-based minerals, stainless steel or combinations thereof.

8. The ground joint coupling of claim 6, the filler being greater than 0% up to about 80% by weight of the seat.

9. The ground joint coupling of claim 6, the filler comprising a maximum of about 40% by volume of the seat.

10. The ground joint coupling of claim 1, the seat being made of ultra high molecular weight polyethylene, polyetheretherketone compounds, polyphenylene sulfide compounds, fluoroplastic compounds, or acetal compounds.

11. The ground joint coupling of claim 10, the seat further including a filler.

12. The ground joint coupling of claim 11, the filler including glass, glass and graphite, carbon, or PFA.

13. The ground joint coupling of claim 11, the filler being greater than 0% up to about 80% by weight of the seat.

14. The ground joint coupling of claim 11, the filler comprising a maximum of about 40% by volume of the seat.

15. A ground joint coupling for steam hoses comprising a stem, a head formed at a first end portion of the stem, a spud having a first end portion facing the first end portion of the stem, the spud being coaxial with the stem, seat receiving means (117) formed on the first end portion of the stem for receiving a seat (107), said seat receiving means comprising an interior recess having a flange with an interior surface which partially defines the interior recess of the stem, an interior annular shoulder formed on the first end portion of the stem and extending inwardly, and a molded polymeric annular seat in said interior recess of the stem, and connection and compression means for connecting the stem to the spud and for compressing the seat between the head of the stem and the shoulder on the first end portion of the spud for providing a seal between the stem and the spud, a hose barb formed at the second end portion of the stem, the connection and compression means including a nut, said seat being formed from polytetrafluouroethylene, ultra high molecular weight polyethylene, polyetheretherketone compounds, polyphenylene sulfide compounds, fluoroplastic compounds, or acetal compounds, said seat further including a filler, the filler including glass, moly, carbon, bronze, graphite, calcium fluoride, polyphenolinesulfide, ceramics, silica-based minerals, PFA, stainless steel, or combinations thereof, and the filler being greater than 0% up to about 80% by weight of the seat.

16. A molded polymeric annular seat for sealing between a ground joint head of a stem and a first end portion of a spud in a ground joint coupling, said seat comprising an annular body, an annular projecting portion extending from the annular body and forming a shoulder (37) adapted to contact a flange (36) of a recess (35) in a spud (21), and, said seat comprising a polymer and a filler, the polymer being polytetrafluouroethylene, ultra high molecular weight polyethylene, polyetheretherketone compounds, polyphenylene sulfide compounds, fluoroplastic compounds, or acetal compounds the filler being glass, moly, carbon, bronze, graphite, calcium fluoride, polyphenoline-sulfide, ceramics, silica-based minerals, PFA, stainless steel, or combinations thereof, the filler being greater than 0% up to about 80% by weight of the seat, and the filler comprising a maximum of about 40% by volume of the seat.

17. The molded polymeric annular seat of claim 16, said annular body of said seat being triangular in cross section.

18. The molded polymeric annular seat of claim 16, said seat having a first end portion (99) adapted to be seated in a ledge (97) formed in stem (95), said seat having a second end portion (103) adapted to be seated in an outside channel (101).

19. The ground joint coupling recited in claim 1 wherein said seat sealing surface has a frustoconical surface profile.

* * * * *